(12) United States Patent
Hellstern et al.

(10) Patent No.: US 10,419,563 B2
(45) Date of Patent: Sep. 17, 2019

(54) PERSISTENT NOTIFICATION CUSTOMIZATION

(71) Applicant: Microsoft Technology Licensing, LLC, Redmond, WA (US)

(72) Inventors: Karl Derek Hellstern, Kirkland, WA (US); Kyle Anthony Werner, Seattle, WA (US); Amin Bagheri, Seattle, WA (US); Sunay Vaishnav, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 214 days.

(21) Appl. No.: 15/283,169

(22) Filed: Sep. 30, 2016

(65) Prior Publication Data

US 2017/0318108 A1    Nov. 2, 2017

Related U.S. Application Data

(60) Provisional application No. 62/329,104, filed on Apr. 28, 2016.

(51) Int. Cl.
*H04L 29/08* (2006.01)
*G06Q 10/10* (2012.01)
*G06F 17/30* (2006.01)

(52) U.S. Cl.
CPC ........... *H04L 67/26* (2013.01); *G06Q 10/109* (2013.01); *H04L 67/18* (2013.01); *H04L 67/306* (2013.01)

(58) Field of Classification Search
USPC ....... 709/206, 203, 227, 217, 219, 223, 224, 709/229, 230
See application file for complete search history.

(56) References Cited

U.S. PATENT DOCUMENTS 8,042,142 B1 * 10/2011 Doshi ................ H04N 21/2343
725/105
8,260,913 B2    9/2012 Knapp et al.
(Continued)

FOREIGN PATENT DOCUMENTS

CN        103124295 A     5/2013

OTHER PUBLICATIONS

"Appsheet + Dropbox", Retrieved on: Apr. 15, 2016, Available at: https://www.appsheet.com/content/solution/build-mobile-apps-with-dropbox-and-appsheet.

(Continued)

*Primary Examiner* — Jude Jean Gilles
(74) *Attorney, Agent, or Firm* — Workman Nydegger (57) ABSTRACT

Customization of persisted notifications, in which when a subject event happens, a notification is persisted. For instance, customization may be according to language, style, or other user preference. This may be particularly useful in situations in which a single user may change styles, user preferences, or even languages; or in which an application that generated the notifications is to be shared amongst various diverse users. For instance, one user may prefer notifications in English—another may prefer notifications in French but be blind, another may prefer Mandarin when she is in a non-English speaking country but English when she is in an English speaking country. The principles described herein allow flexible customizations and localizations of persistent notifications without having to translate every notification into every possible language, or persist the notification according to every possible style or user preference.

20 Claims, 9 Drawing Sheets

(56) References Cited

U.S. PATENT DOCUMENTS

| | | | |
|---|---|---|---|
| 8,473,566 B1* | 6/2013 | Cardente | G06F 3/061 370/252 |
| 9,535,828 B1* | 1/2017 | McKelvie | G06F 12/0246 |
| 9,875,180 B2* | 1/2018 | Talagala | G06F 12/0246 |
| 2002/0091539 A1* | 7/2002 | Yin | G06Q 10/0639 705/7.38 |
| 2002/0095403 A1* | 7/2002 | Chandrasekaran | G06F 12/0804 |
| 2002/0147726 A1* | 10/2002 | Yehia | G06Q 10/10 |
| 2003/0040970 A1* | 2/2003 | Miller | G06Q 30/02 705/26.1 |
| 2003/0097485 A1 | 5/2003 | Horvitz et al. | |
| 2005/0235018 A1* | 10/2005 | Tsinman | G06F 9/466 |
| 2005/0262475 A1* | 11/2005 | Halpern | G06F 8/71 717/114 |
| 2009/0254971 A1* | 10/2009 | Herz | G06Q 10/10 726/1 |
| 2009/0268024 A1* | 10/2009 | Tsukuda | G08B 13/19682 348/143 |
| 2011/0047480 A1 | 2/2011 | Venkataraman | |
| 2011/0258483 A1* | 10/2011 | Elson | G06F 11/1662 714/4.11 |
| 2012/0054152 A1* | 3/2012 | Adkins | G06F 17/30371 707/623 |
| 2012/0072850 A1* | 3/2012 | Megiddo | G06F 17/3089 715/745 |
| 2012/0297023 A1* | 11/2012 | Buer | H04W 28/16 709/217 |
| 2013/0110943 A1* | 5/2013 | Menon | G06Q 10/107 709/206 |
| 2014/0006494 A1* | 1/2014 | George | H04W 4/21 709/204 |
| 2014/0082586 A1 | 3/2014 | Casey | |
| 2014/0280484 A1 | 9/2014 | Klemenz et al. | |
| 2015/0039772 A1* | 2/2015 | Natesan | H04L 67/12 709/227 |
| 2016/0092304 A1* | 3/2016 | Tabrizi | G06F 11/1072 714/6.24 |
| 2016/0314253 A1* | 10/2016 | Incze | G06F 19/328 |
| 2017/0109391 A1* | 4/2017 | Rosen | G06F 17/2247 |

OTHER PUBLICATIONS

Angeles, Sara, "Best App Makers", Published on: Dec. 8, 2015, Available at: http://www.businessnewsdaily.com/4901-best-app-makers-creators-html.

Foley, Mary Jo, "Microsoft takes wraps off PowerApps mobile-app creation service", Published on: Nov. 30, 2015, Available at: http://www.zdnet.com/article/microsoft-takes-wraps-off-powerapps-mobile-app-creation-service/.

"Asset Manager", Published on: Aug. 27, 2011, Available at: http://www.yiiframework.com/forum/index.php/topic/23055-asset-manager/.

Smith, Grace, "10 Excellent Platforms for Building Mobile Apps", Published on: Dec. 3, 2013, Available at: http://mashable.com/2013/12/03/build-mobile-apps/#bQoeB6Vsuqq2.

Ball, et al., "Beyond Open Source: The Touch Develop Cloud-Based Integrated Development Environment", In 2nd ACM International Conference on Mobile Software Engineering and Systems, May 16, 2015, pp. 83-93.

"International Search Report and the Written Opinion issued in PCT Application No. PCT/US2017/029512 dated Aug. 7, 2017."

\* cited by examiner

| Type | Version | Parameters | Possible Template |
|---|---|---|---|
| "ActionTaken" | 1.0 | {"John Doe"} | "{0} took an action!" |
| "ActionTaken" | 1.1 | {"John Doe", "something"} | "{0} took action {1}!" |

*Figure 10*

PERSISTENT NOTIFICATION CUSTOMIZATION

CROSS-REFERENCE TO RELATED APPLICATION

This application claims the benefit of U.S. Provisional Patent Application Ser. No. 62/329,104, filed Apr. 28, 2016, which provisional patent application is incorporated herein by reference in its entirety.

BACKGROUND

In computer systems, when an event of interest happens, a user is often presented in real-time with a notification. For instance, an e-mail might be received, a user may have connected to a particular network, a temperature may have dropped to a certain level, a stock price may have risen to a certain level, and so forth. Some notifications may occur in response to a default set of events. Others might be in response to events for which the user has subscribed to notifications.

The notification may present on a user interface in any suitable manner. For instance, a notification may be presented in a small window that appears on a user interface. Alternatively, or in addition, a user interface element may be adorned or altered in a particular way so as to convey the notification to the user. There might also be sound or other sensory communication made in response to detection of an event.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Computer-assisted notification systems are designed to generate notifications in response to subject events that are being monitored (e.g., events that have been subscribed to by one or more users, and/or a set of predetermined events). In push notification systems, event notifications are pushed to users as the subject event happens. The principles described herein related to persisted notifications, in which when a subject event happens, a notification is persisted. An application that thereafter desires notifications may then request the notification from the notification system. The notification system then retrieves the notification and sends the notification to the requesting application. As an example, the user can query a service to see if anything of interest has happened recently—for instance, perhaps one of the user's resources linked to the service has changed state.

The principles described herein further related to the customization of persisted localizations. For instance, customization may be according to language, style, or other user preference. This may be particularly useful in situations in which a single user may change styles, user preferences, or even languages; or in which an application that generated the notifications is to be shared amongst various diverse users. For instance, one user may prefer notifications in English—another may prefer notifications in French but be blind, another may prefer Mandarin when she is in a non-English speaking country but English when she is in an English speaking country. The principles described herein allow flexible customizations and localizations of persistent notifications without having to translate every notification into every possible language, or persist the notification according to every possible style or user preference.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Computer-assisted notification systems are designed to generate notifications in response to subject events that are being monitored (e.g., events that have been subscribed to by one or more users, and/or a set of predetermined events). In push notification systems, event notifications are pushed to users as the subject event happens. The principles described herein related to persisted notifications, in which when a subject event happens, a notification is persisted. An application that thereafter desires notifications may then request the notification from the notification system. The notification system then retrieves the notification and sends the notification to the requesting application. As an example, the user can query a service to see if anything of interest has happened recently—for instance, perhaps one of the user's resources linked to the service has changed state.

The principles described herein further related to the customization of persisted localizations. For instance, customization may be according to language, style, or other user preference. This may be particularly useful in situations in which a single user may change styles, user preferences, or even languages; or in which an application that generated the notifications is to be shared amongst various diverse users. For instance, one user may prefer notifications in English—another may prefer notifications in French but be blind, another may prefer Mandarin when she is in a non-English speaking country but English when she is in an English speaking country. The principles described herein allow flexible customizations and localizations of persistent notifications without having to translate every notification into every possible language, or persist the notification according to every possible style or user preference.

Because the principles described herein operate in the context of a computing system, a computing system will now be described with respect to FIG. 1 Thereafter, further details regarding the efficient customization of persisted notifications will be described with respect to FIGS. 2 through 10.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
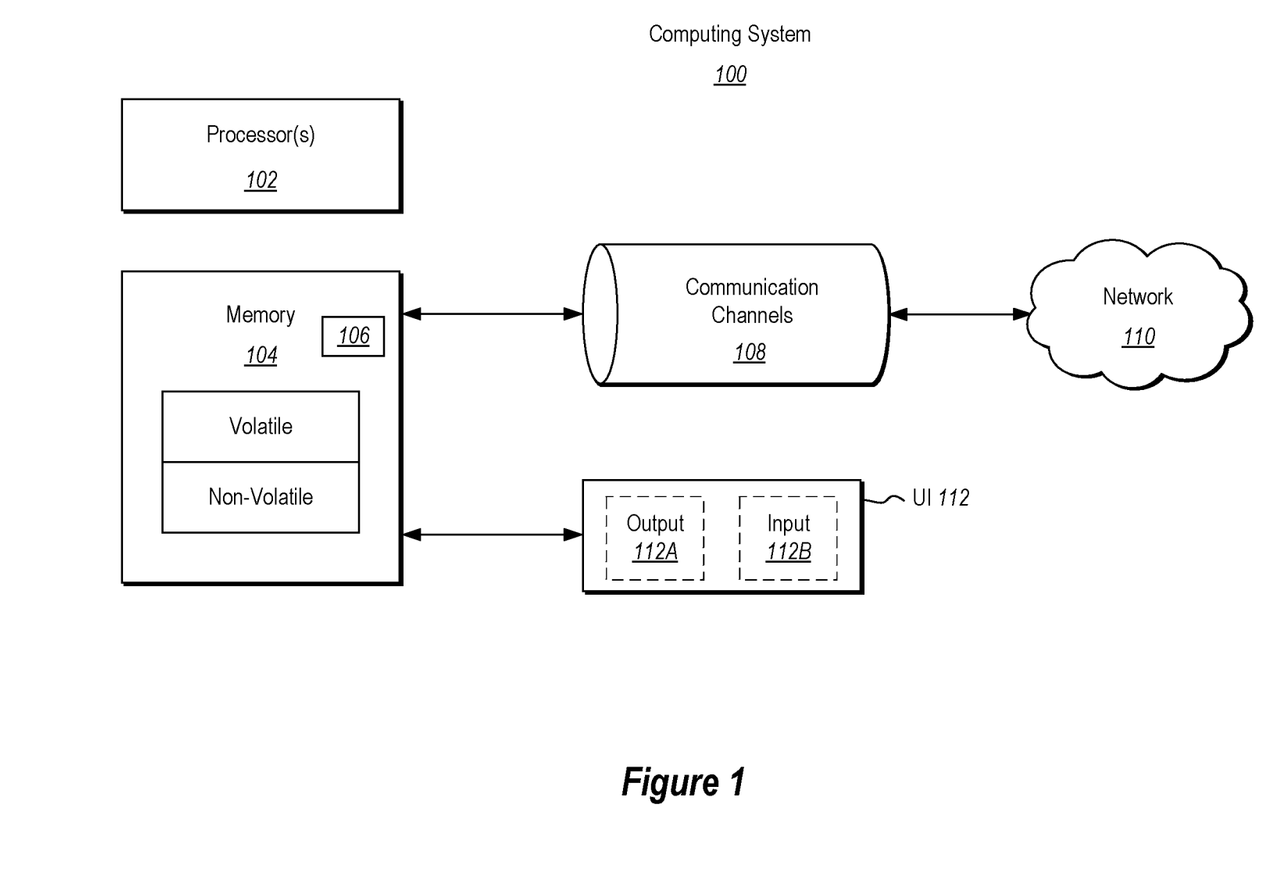
FIG. 1 illustrates a computing system in which the principles described herein may operate.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "virtual machine", "scheduler", "manager", "compiler", or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, projectors, tactile output, valves, actuators, holograms, virtual reality, and so forth. Examples of input mechanisms 112B might include, for instance, microphones, touchscreens, holograms, virtual reality controls, cameras, keyboards, accelerometers, levers, pedals, buttons, knobs, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

First, an easier to start (but less efficient to run) approach (a "first embodiment") will be described with respect to FIGS. 2 through 5. Then, a more complex (but more efficient and flexible) approach (a "second embodiment") will be described with respect to FIGS. 5 through 9. Thereafter, versioning will be described with respect to FIG. 10.

Figure 2:
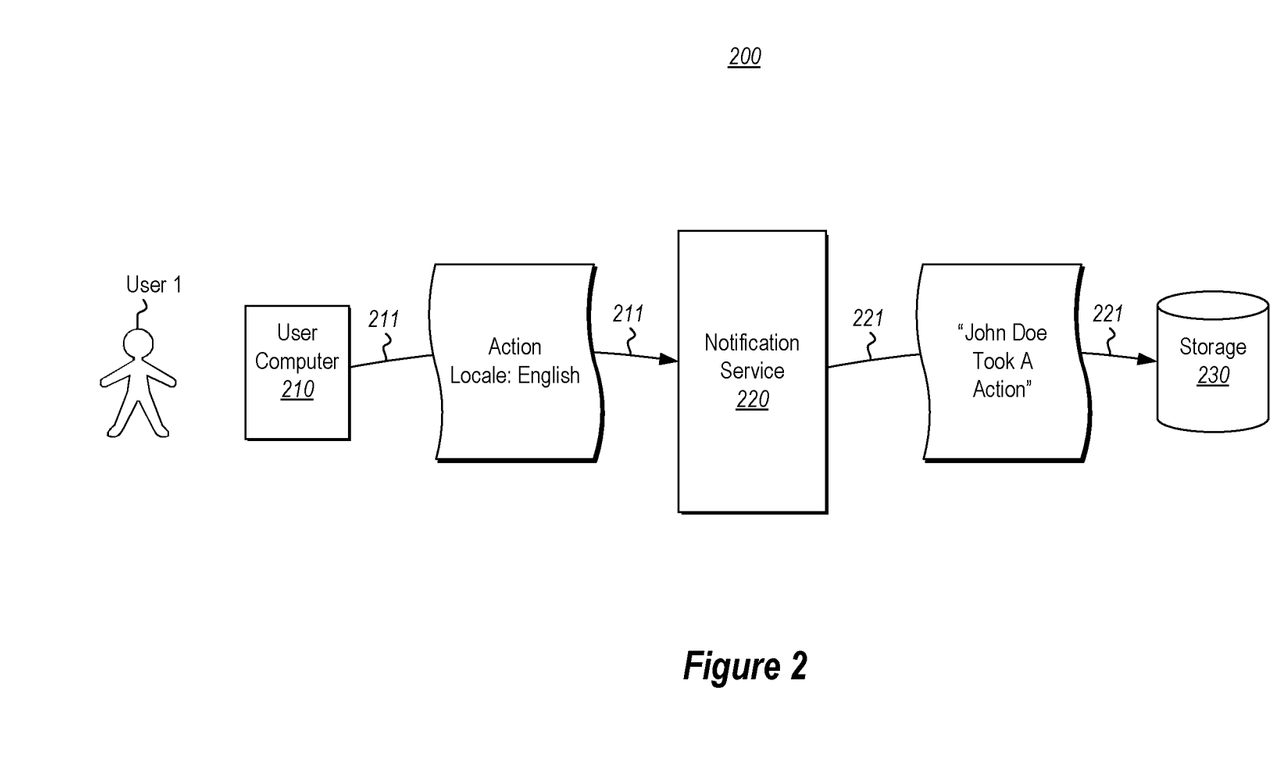
FIG. 2 illustrates the storage process of a first embodiment of the principles described herein in which the notification is stored already in a customized form.
Figure 3:
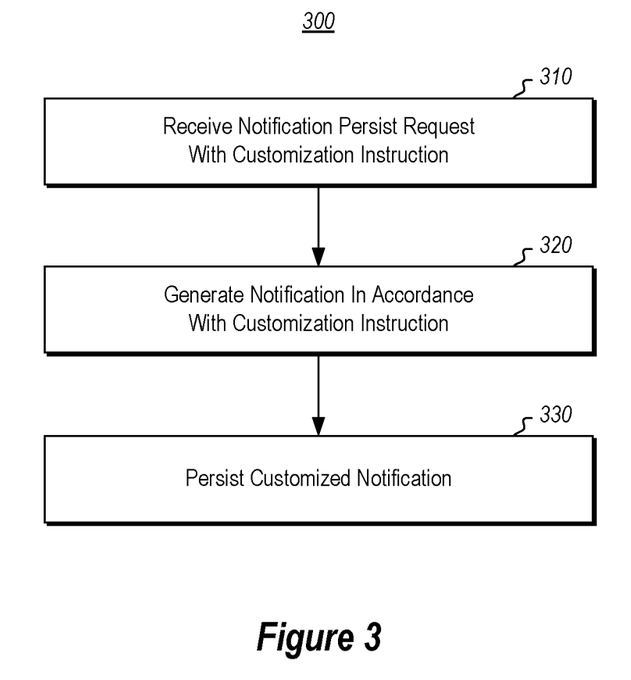
FIG. 3 illustrates a flowchart of a method for storing in accordance with the first embodiment described herein in which the notification is stored already in customized form.
Figure 4:
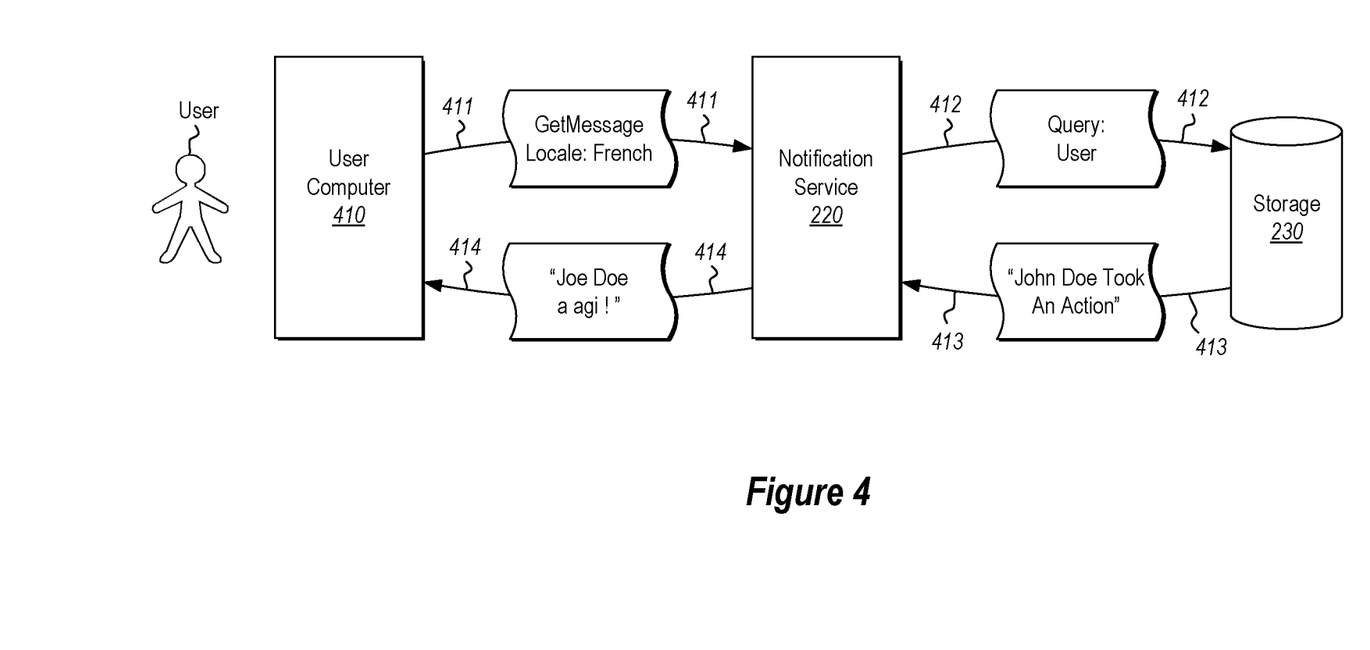
FIG. 4 illustrates the retrieval process of a first embodiment of the principles described herein in which the notification was stored already in a customized form, and in which re-customization is performed upon retrieval.
Figure 5:
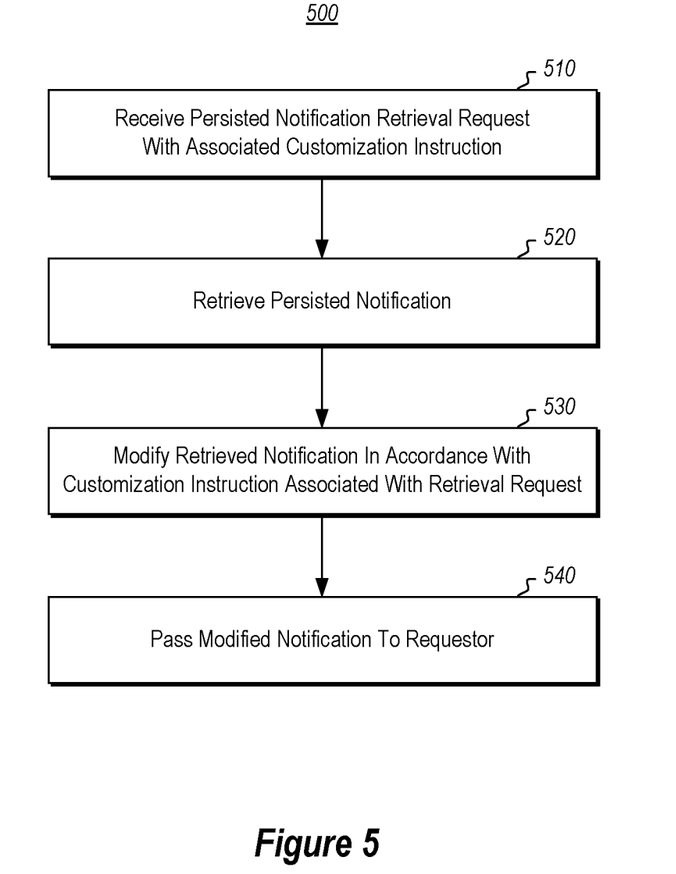
FIG. 5 illustrates a flowchart of a method for retrieving in accordance with the first embodiment described herein in which the notification was stored already in customized form, and in which re-customization is performed upon retrieval.
Figure 6:
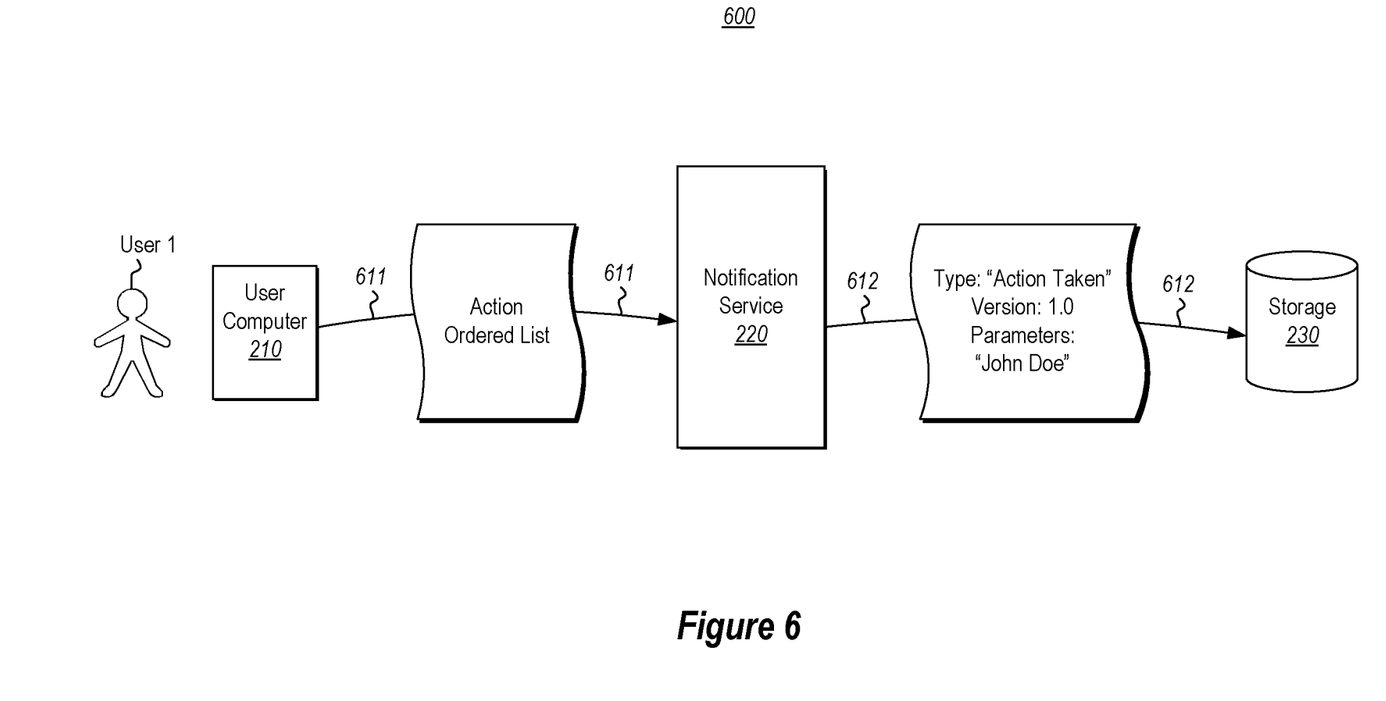
FIG. 6 illustrates the storage process of a second embodiment of the principles described herein in which the notification is stored as metadata without first being customized.
Figure 7:
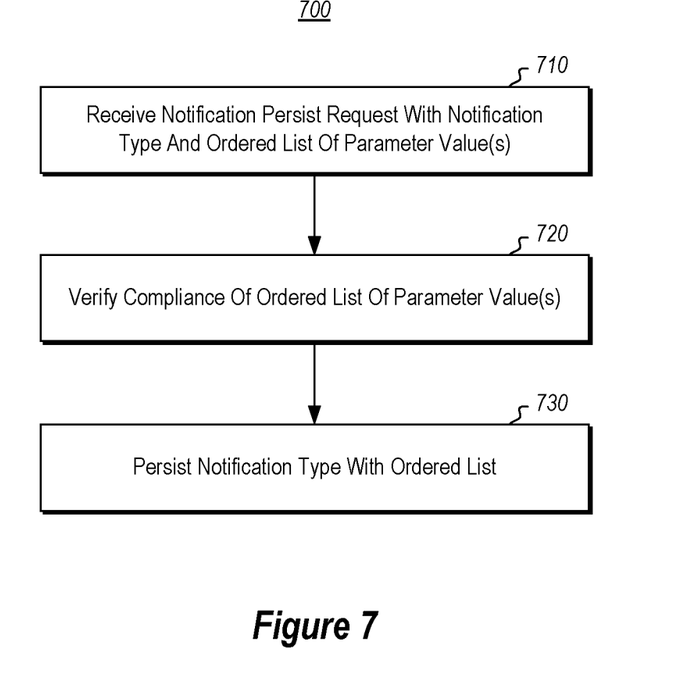
FIG. 7 illustrates a flowchart of a method for storing in accordance with the second embodiment described herein in which the notification is stored as metadata without first being customized.
Figure 8:
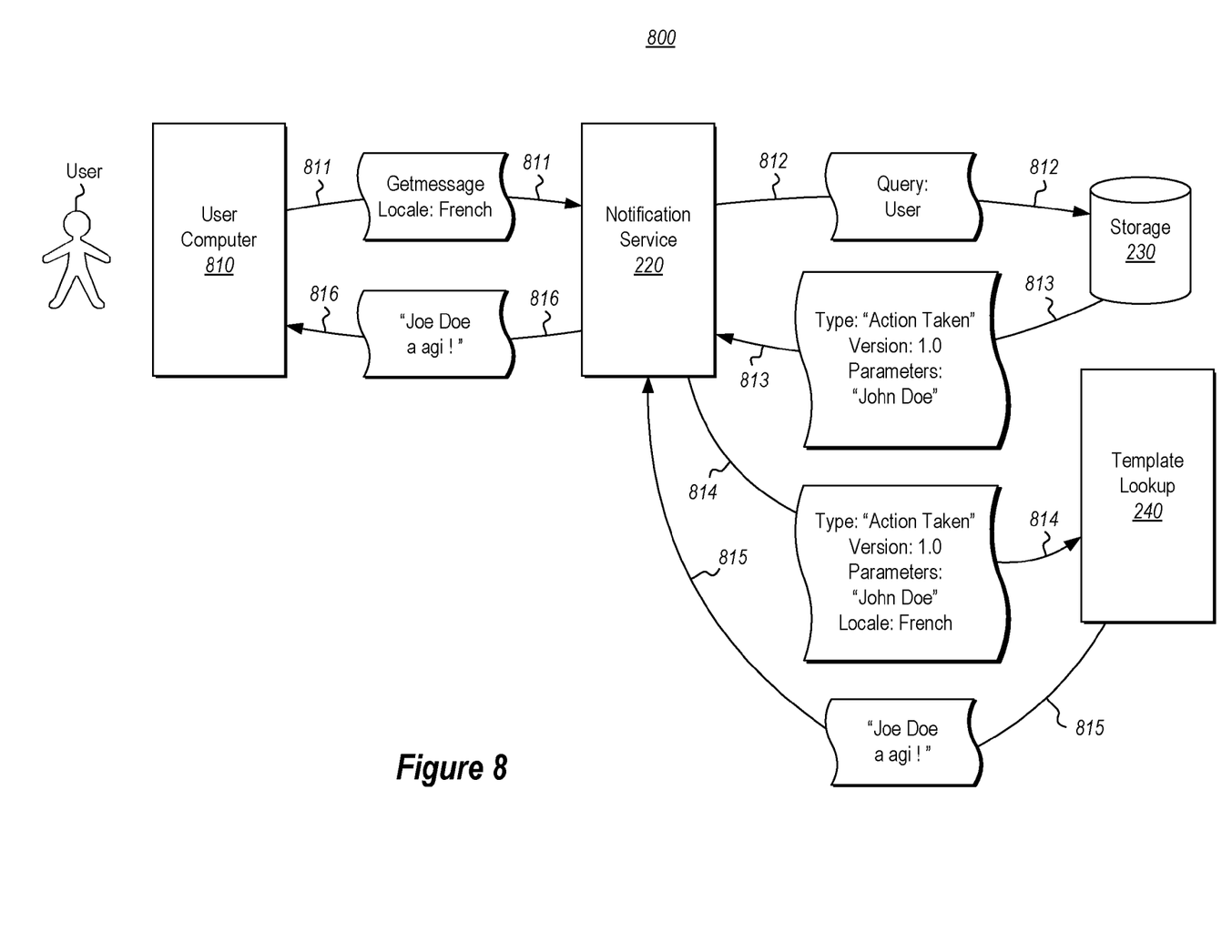
FIG. 8 illustrates the retrieval process of a second embodiment of the principles described herein in which the notification is customized upon retrieval.
Figure 9:
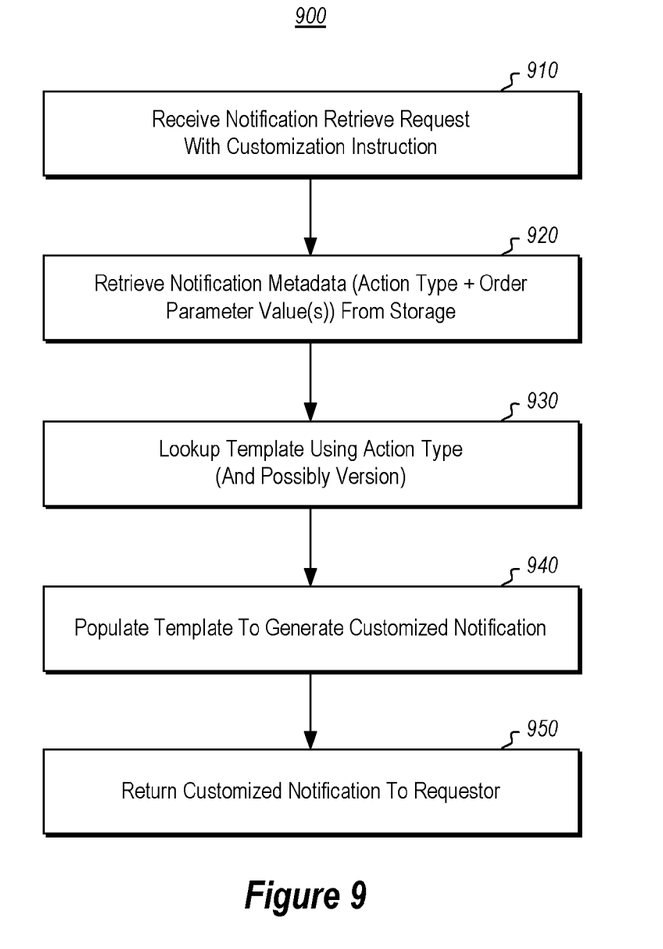
FIG. 9 illustrates a flowchart of a method for retrieving in accordance with the second embodiment described herein in which the notification is customized upon retrieval.

With respect to the first embodiment, FIGS. 2 and 3 illustrate the data flow and method for storing a persisted notification, and FIGS. 4 and 5 illustrate the data flow and method for retrieving a persisted notification. With respect to the second embodiment, FIGS. 6 and 7 illustrate the data flow and method for storing a persisted notification, and FIGS. 8 and 9 illustrate the data flow and method for retrieving a persisted notification. In each of these data flow examples of the first and second embodiments, the notification is that an individual named "John Doe" took an action.

FIG. 2 shows the storage process 200 of a first embodiment of the principles described herein. FIG. 3 illustrates a flowchart of a method 300 for storing in accordance with the first embodiment described herein. Accordingly, the storage process of FIG. 2 (the first embodiment) will now be described with frequent reference to the method 300 of FIG. 3.

In this embodiment of FIG. 2, a computing system generates an event related to User 1, whom we call "John Doe" in this example. FIG. 2 show this event as having been generated by a computing system 210 associated with User 1, but it could be generated by any computing system that can send requests to the notification service. Accordingly, the generator computing system 210 sends a notification persist request 211 to the notification service 220.

The notification persist request 211 includes 1) an identification of the action, 2) an identification of the entity that took the action, and 3) a customization parameter. In this case, the identification of the action is simply listed as "Action". However, the action could be any of a number of pre-defined actions such as: application shared, permission delegated, new version published, or the like. In this example, the identification of the entity that took the action is simply "John Doe". Furthermore, the customization parameter and value is "Locale: English".

In any case, from the notification service perspective, the notification service receives a request to persistent a notification that includes a customization instruction (act 310). For instance, "Locale: English" may be interpreted as an instruction to customize the notification to be in the English language. Accordingly, the notification service 220 generates a string "John Doe took an action", and stores (as represented by arrow 221) that string within the storage 230. More generally speaking, the notification service 220 generates a customized notification in accordance with the customization instruction (act 320), and persists the customized notification (act 330).

FIG. 4 shows the retrieval process 400 of the first embodiment of the principles described herein. FIG. 5 illustrates a flowchart of a method 500 for retrieving the persisted notification in accordance with the first embodiment of the principles described herein. Accordingly, the retrieval process of FIG. 4 (the first embodiment) will now be described with frequent reference to the method 500 of FIG. 5.

For retrieval, the same user or a different user may request to see the persisted notification. For instance, in FIG. 4, the user via their computing system 410 requests (as represented by arrow 411) a notification (e.g., using the "Get Message") from the notification service 220, and specifies a customization parameter and value (in this case that the Locale is French). From the notification service 220 perspective, the notification service 220 receives a request to read the persisted notification that is associated with (e.g., includes) a customization instruction (act 510).

The service 220 responds by retrieving (as represented by arrows 412 and 413) the persisted notification (act 520). In the example of FIG. 4, the retrieved persisted notification is string "John Doe took an action!", which is the notification persisted in the example data flow of FIG. 2. The notification service 220 then modifies the retrieved notification in accordance with the customization instruction (act 530). In the example of FIG. 4, this includes translating the English string "John Doe took an action" to an equivalent French string "John Doe a agi". The notification service 220 then provides the modified notification in response to the read request (act 540). For instance, in FIG. 4, the notification service 220 passes the notification <<John Doe a agi!>> back to the user that requested to read the persisted notification as represented by arrow 414.

One limitation of this first embodiment approach is that it is difficult to always respect the customization parameters of the user's retrieval (or read) request. Though the user has requested to view the notification in French, the notification is stored as an English string. The choices are either not to honor the customization request (and simply return the English string), or attempt to provide a French string by translation of English to French. This translation could be dynamic in response to a request for a notification in a different language than the notification is persisted in, or may be done in advance for those notifications that are of significance. However, this dynamic translation is difficult and prone to errors. This translation could be dynamic in response to a request for a notification in a different language. Furthermore, if the text of the notification is to be retroactively changed (e.g., to fix a typo), the raw text in storage for each equivalent notification should be changed. This update process is also error-prone, especially when the message has user-specific content—such as a name.

The second embodiment (described with respect to FIGS. 6 through 9) is more complex architecturally, but circumvents both of these limitations by storing a signature for each notification, instead of the literal text for the notification. This signature allows the notification to be reconstructed at-will in any customization using updatable message templates.

FIG. 6 shows the storage process 600 of a second embodiment of the principles described herein. FIG. 7 illustrates a flowchart of a method 700 for storing in accordance with the second embodiment described herein. Accordingly, the storage process of FIG. 6 (the second embodiment) will now be described with frequent reference to the method 700 of FIG. 7.

Storage in the second embodiment is different than storage in the first embodiment in that when the notification-causing action occurs, instead of storing text, metadata is stored about the notification. The metadata includes 1) a type identifier (e.g., ActionTaken) that indicates the type of notification being stored; 2) a version number (e.g., 1.0 in this example) that indicates the arity and order of parameters, and 3) and an ordered list of parameters compliant with the arity and order of the version.

For instance, the generator computing system 210 detects an event with respect to User 1. Again, although FIG. 6 show this event as having been generated by a computing system 210 associated with User 1, but it could be generated by any computing system that can send requests to the service. Accordingly, the generator computing system 210 sends a notification persist request (as represented by arrow 611) to the notification service 220. The notification persist request 611 includes 1) a type identifier (e.g., ActionTaken) that indicates the type of notification being stored; 2) a version number (e.g., 1.0 in this example) that indicates the arity and order of parameters, and 3) and an ordered list of parameters compliant with the arity and order of the version. In this case, there is but one parameter and its value is "John Doe". The notification service 220 then persists (as represented by arrow 612) the type identifier, the version, and the ordered list of parameter(s) in the storage 230.

From the perspective of the notification service, the notification service 220 again receives a notification persist request (act 710), but this time the notification persist request includes a type of notified of, and an ordered list of one or more parameter values compliant with the arity of the type of notification. Note that there need not be any customization instruction at this stage. Customization may be deferred until retrieval. Furthermore, there may be multiple versions of a type of notification, each version perhaps having a different arity. The notification persist request might specify also the version of the notification. The notification service 220 may optionally verify correctness of the arity of the parameter values (act 720), and if verified then persists the type of notification and the compliant ordered list of one or more parameter values (act 730).

FIG. 8 shows the retrieval process 800 of the second embodiment of the principles described herein. FIG. 8 illustrates a flowchart of a method 800 for retrieving the persisted notification in accordance with the second embodiment of the principles described herein. Accordingly, the retrieval process of FIG. 7 (the second embodiment) will now be described with frequent reference to the method 800 of FIG. 8.

The same as for the first embodiment, for retrieval, the same user or a different user may request to see the notification. For instance, in FIG. 8, the requesting computing system 810 for a user requests (as represented by arrow 811) a notification (e.g., using the "Get Message") from the notification service 220, and specifies a customization parameter and value (in this case that the Locale is French). From the notification service perspective, the notification service receives a request to retrieve the persisted notification in accordance with a customization instruction (act 910).

Next, the notification service 220 queries (as represented by arrow 812) storage 230 to retrieve (as represented by arrow 813) the notification metadata for the requested notification (act 920). Recall that the notification metadata includes at least an identification of the type of notification, as well as the ordered list of parameter value(s). In the example, the notification metadata includes the type of notification being "ActionTaken", along with a version number 1.0 that was used to check the arity of the parameter value(s), and the parameter value(s) themselves.

Next, the notification service 220 causes an appropriate template given the action type (and potentially the version) and the customization instruction (act 930). For instance, in FIG. 3, the notification service 220 passes the retrieved metadata (as represented by arrow 814), along with the customization information that the user supplied with their GET request (in this case "Locale: French") to a template lookup subsystem 240.

The notification system 220 also causes the template to be populated with the order parameter value(s) to generate the customized notification (act 940). This may also be accomplished by making the request to the template lookup subsystem, though the notification service may perform this action directly. In the case of FIG. 8, the template lookup system 240 efficiently maps a Type, Version, and the customization information (i.e., Locale: French) to a pre-computed template appropriate for the customization, which is then populated with the ordered list of parameter value(s) supplied by the metadata, and returned (as represented by arrow 815) the populated customized notification to the notification service 220. In this case, the pre-computed template for Locale: French and Type: ActionTaken and Version: 1.0 might be "{0} a agi" where {0} is replaced by the parameter value of the first parameter. In this example, the populated, pre-computed template would read "John Doe a agi!".

Finally, the notification service returns (as represented by arrow 216) the localized, parameterized notification to the user (act 950). Note the different customization templates may be provided for other dimensions, other than language. For instance, level of formality might be a customization— styles might be another. However, any user preferred or default customization may suffice.

A notification template can be updated. If the notification template is updated so as to replace a prior notification template entirely (as might be the case if a typo was being corrected), then perhaps the version number of the notification template need not be updated (so long as the arity and ordering remains the same).

If a notification template is to be updated without replacing the prior notification, then a new version number is assigned to the notification template. This is particularly important where their identity, arity, and/or ordering of the parameters to be supplied to the notification template changes. In that case, generators will be updated to comply with the newer version, but it will require no changes in any of the clients.

Figure 10:
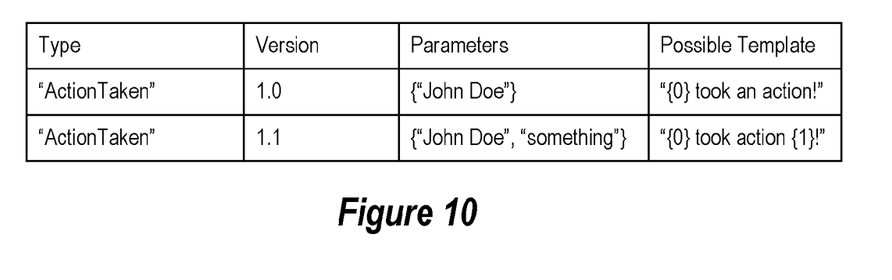
FIG. 10 illustrates a versioning table that may be used to track versions of notifications.

For instance, considering the template table of FIG. 10. According to FIG. 10, a second more specific notification template (of version 1.1) is generated that requires the generator specify (as a second parameter of the notification generation request) what action was taken. Accordingly, for different versions, different arity of parameters may be appropriate, along with perhaps different static content. This allows notifications to be easily changed by altering a version. A given version may also be easily changed by changing static content as available.

Accordingly, the principles described herein dynamically translate notifications to the locale the user requests at the time they make their request. In addition, notifications of a given type may be retroactively updated by simply changing the mappings done in the template lookup service. Furthermore, notifications may be according to any customization, of which localization is only one.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computing system comprising:
   one or more processors;
   one or more computer-readable media having thereon computer-executable instructions that, when executed by the one or more processors, the computing system is caused to perform a method for persisting notification metadata in response to receiving a request to persist a notification, the method comprising:
   determining a type of the notification;

storing metadata of the notification, the stored metadata including at least the determined type of the notification, an arity and an order of parameters of the notification, and an ordered list of parameter values of the notification, the ordered list of parameter values being compliant with the arity and order of parameters, the metadata being stored such that the metadata can be retrieved in response to a request and a customized notification can be generated according to a requested customization.

2. The computing system in accordance with claim 1, the method further comprising:
prior to the act of storing the metadata, an act of verifying that the arity of the one or more parameter values is correct given the determined type of the notification.

3. The computing system in accordance with claim 1, the metadata further comprising a version of the notification.

4. The computing system in accordance with claim 3, the method further comprising:
prior to the act of storing the metadata, an act of verifying that the arity of the one or more parameter values is correct given the version of the notification.

5. The computing system in accordance with claim 3, the method further comprising:
prior to the act of storing the metadata, an act of verifying that the arity of the one or more parameter values is correct given the version of the notification and the determined type of the notification.

6. A method for formulating a notification in accordance with a customization instruction, the method comprising:
receiving a customization instruction for a notification of a particular type;
determining the particular type of the notification;
obtaining persisted metadata of the notification of the particular type, the persisted metadata including an arity and an order of parameters of the notification and an ordered list of parameter values of the notification, the ordered list of parameter values being compliant with the arity and order of the parameters of the notification;
selecting a template based on the particular type of the notification; and
causing a customized notification to be generated by populating the selected template with the ordered list of parameter values of the notification.

7. The method in accordance with claim 6, further comprising:
an act of responding to the customization instruction with the customized notification.

8. The method in accordance with claim 6, the obtained metadata further comprising a version of the notification of the particular type, the template being further selected based on the version of the notification as well as the particular type of the notification.

9. The method in accordance with claim 8, the version being specified in the customization instruction.

10. The method in accordance with claim 8, wherein the arity of the one or more parameter values that may be used to populate the template changes according to version.

11. The method in accordance with claim 6, the customization instruction including an instruction to provide a notification in a particular language.

12. The method in accordance with claim 6, the customization instruction including an instruction to provide a notification in a particular format.

13. The method in accordance with claim 6, the customization instruction including an instruction to provide a notification in accordance with one or more user preferences.

14. The method in accordance with claim 6, the customization instruction including an instruction to provide a notification in accordance with a particular style.

15. A method for persisting a customized notification, the method comprising:
receiving a request to persist a notification, the request including a customization instruction;
determining a type of the notification;
selecting a template based on the particular type of the notification;
generating a customized notification in accordance with the customization instruction and the type of the notification, the customized notification including an arity and an order of parameters of the notification, generating the customized notification including populating the selected template including an ordered list of parameter values of the notification, the ordered list of parameter values being compliant with the arity and order of the parameters of the notification; and
persisting the customized notification.

16. The method in accordance with claim 15, the customization instruction identifying a language in which to persist the notification, the act of generating the customized notification comprising generating a notification in the instructed language.

17. The method in accordance with claim 15, the request further identifying an identification of an action that the notification is notifying of, the act of generating a customized notification in accordance with the customization instruction comprising:
an act of generating the notification so as to include the identification of the action.

18. The method in accordance with claim 17, the request further identifying an actor that performed the action, the act of generating a customized notification in accordance with the customization instruction comprising:
an act of generating the notification so as to include the identification of the actor that performed the action.

19. The method in accordance with claim 15, further comprising:
an act of receiving a request to read the persisted notification, the request including a customization instruction, the request including a customization instruction that specifies a different customization instruction than the customization instruction instructed by the customization instruction received when persisting the notification.

20. The method in accordance with claim 19, the method further comprising the following in response to receiving the request to read the persisted notification:
an act of retrieving the persisted notification;
an act of modifying the retrieved notification in accordance with the customization instruction associated with the read request; and
an act of providing the modified notification in response to the read request.

* * * * *